United States Patent
Gaurav et al.

(10) Patent No.: US 10,248,618 B1
(45) Date of Patent: Apr. 2, 2019

(54) SCHEDULING SNAPSHOTS

(71) Applicant: EMC Corporation, Hopkinton, MA (US)

(72) Inventors: Natasha Gaurav, Hopkinton, MA (US); Bruce R. Rabe, Dedham, MA (US); Binbin Liu Lin, West Boylston, MA (US); Scott E. Joyce, Foxborough, MA (US); Vidhi Bhardwaj, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 14/230,598

(22) Filed: Mar. 31, 2014

(51) Int. Cl.
*G06F 17/30* (2006.01)
*G06F 16/11* (2019.01)

(52) U.S. Cl.
CPC ................... *G06F 16/128* (2019.01)

(58) Field of Classification Search
CPC ......... G06F 17/30067; G06F 17/30088; G06F 17/30578; G06F 2201/84; G06F 2201/835; G06F 11/1469; G06F 16/128
USPC .................. 707/618, 639, 649, 654
See application file for complete search history.

(56) References Cited

U.S. PATENT DOCUMENTS

| | | | | |
|---|---|---|---|---|
| 9,185,188 | B1* | 11/2015 | Li | G06F 9/46 |
| 9,495,251 | B2* | 11/2016 | Kottomtharayil | G06F 11/1448 |
| 2006/0112135 | A1* | 5/2006 | Warshawsky | G06F 11/3452 |
| 2006/0212481 | A1* | 9/2006 | Stacey | G06F 17/30067 |
| 2006/0218450 | A1* | 9/2006 | Malik | G06F 11/3409 714/47.1 |
| 2007/0198605 | A1* | 8/2007 | Saika | G06F 17/30088 |
| 2014/0006354 | A1* | 1/2014 | Parkison | G06F 17/30194 707/649 |
| 2014/0019228 | A1* | 1/2014 | Aggarwal | G06Q 30/0244 705/14.43 |
| 2014/0108348 | A1* | 4/2014 | Ahrens | G06F 17/30174 707/639 |
| 2014/0108351 | A1* | 4/2014 | Nallathambi | G06F 17/30088 707/639 |
| 2015/0212897 | A1* | 7/2015 | Kottomtharayil | G06F 11/1448 714/20 |
| 2016/0139823 | A1* | 5/2016 | Costea | G06F 3/0611 711/162 |

* cited by examiner

*Primary Examiner* — Greta L Robinson
(74) *Attorney, Agent, or Firm* — Krishnendu Gupta

(57) ABSTRACT

There are disclosed computer-implemented methods, apparatus, and computer program products for scheduling snapshots. In one embodiment, the method comprises the following steps. The method comprises receiving performance data relating to a data storage system. The method also comprises determining, based on the performance data, a time for performing a snapshot of data stored on the data storage system. The method further comprises scheduling the snapshot according to the time.

9 Claims, 5 Drawing Sheets

SCHEDULING SNAPSHOTS

FIELD OF THE INVENTION

The present invention relates generally to data storage systems. More particularly, the invention relates to computer-implemented methods, apparatus, and computer program products for scheduling snapshots.

BACKGROUND OF THE INVENTION

The amount of data stored on digital computing systems has increased dramatically in recent years. Accordingly, users have become increasingly reliant on the storage devices of these systems to store this data. Typically, the data stored on the storage devices undergo modifications. These modifications may arise from user intervention, periodic system updates or alterations, computer initiated processes, or some other source. Whatever the source of the modifications, it is often useful to preserve and permit access to previous versions of the data such as, for example, files and directories. Some instances of when access to previous versions may be useful include, but are not limited to, inadvertently deleted or overwritten data, providing external access to older versions of data while newer versions are being updated, and determining changes to storage device usage over time.

One response to preserving older versions of files has been to copy the entire contents of the storage device to a backup or second storage device. A digital computing system employing this technique will often encounter numerous problems. One, copying entire data systems is time consuming and delays write requests to data on the storage device. Second, this type of backup is financially expensive because it often requires the purchase of additional storage space. Finally, this option does not permit system flexibility.

Moreover, the aforementioned problems are amplified when modern, large-capacity storage devices and distributed storage systems comprising numerous large-capacity storage devices are considered.

More recently, "snapshot" type backup systems and/or programs have been provided, which are capable of storing backup data more frequently, in some cases as often as a user requests. A snapshot copy contains the state at a respective point in time when the snapshot copy is created.

There is, however, a need for intelligent snapshot based backup methods and systems.

SUMMARY OF THE INVENTION

There is disclosed a computer-implemented method, comprising: receiving performance data relating to a data storage system; based on the performance data, determining a time for performing a snapshot of data stored on the data storage system; and scheduling the snapshot according to the time.

There is also disclosed an apparatus, comprising: at least one processing device, said at least one processing device comprising a processor coupled to a memory; wherein the apparatus is configured to: receive performance data relating to a data storage system; based on the performance data, determine a time for performing a snapshot of data stored on the data storage system; and schedule the snapshot according to the time.

There is further disclosed a computer program product having a non-transitory computer-readable medium storing instructions, the instructions, when carried out by one or more processors, causing the one or more processors to perform a method of: receiving performance data relating to a data storage system; based on the performance data, determining a time for performing a snapshot of data stored on the data storage system; and scheduling the snapshot according to the time.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Traditionally, certain data storage systems create schedulers to take snapshot at a predefined time. For example, the snapshot may be taken at 4:00 AM each morning. The rationale, typically, for setting such a time is that there is generally minimum I/O running at 4:00 AM. The difficulty is that global businesses work continually work throughout the day meaning that existing assumptions of time of minimum I/O are not applicable anymore.

Techniques described herein determine a suitable period of time to take a snapshot of data stored on a data storage system based on performance data relating to the data storage system. For example, the time for taking the snapshot can be based on historical data that indicates the number of I/O operations in connection with the data storage system over a period of time.

Advantageously, the techniques described herein are not affected by the global nature of businesses as the system may intelligently schedule a time for snapshot creation by considering factors such as the IO load and system load.

Figure 1:
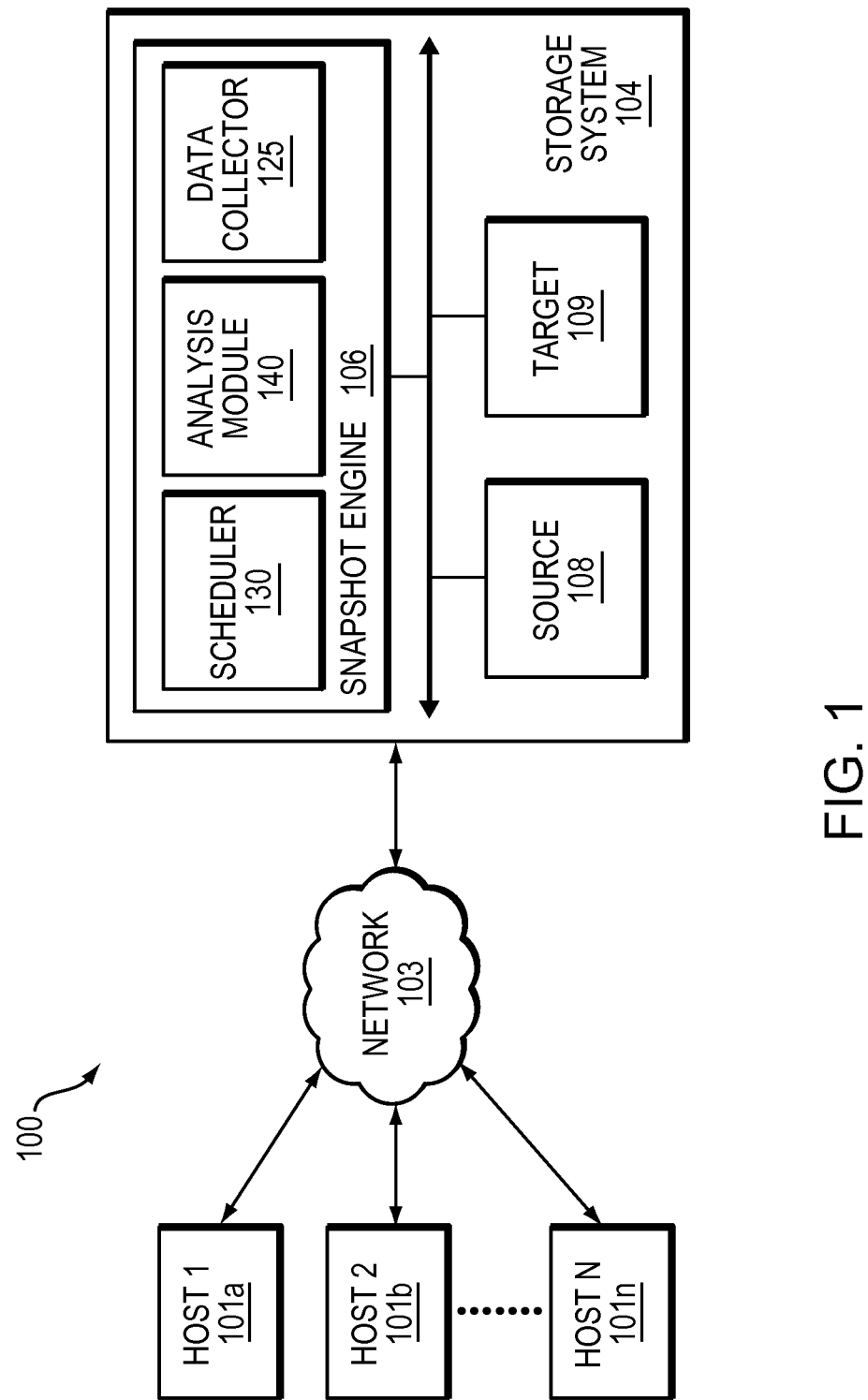
FIG. 1 is a block diagram illustrating a storage system according to one embodiment of the invention.

FIG. 1 is a block diagram illustrating a system 100 according to one embodiment of the invention. The system 100 includes, but is not limited to, hosts (101a, 101b, 101n) communicatively coupled to a storage system 104 over a network 103. Storage system 104 may store and manage data. Hosts 140a-140n may access storage system 104, for example, in performing input/output (I/O) operations, data requests, and other operations. Network 103 may be any type of networks such as a local area network (LAN), a wide area network (WAN) such as Internet, or a combination thereof.

Storage system 104 is also configured to implement the techniques described herein for scheduling snapshots. In one embodiment, storage system 104 includes, but is not limited to, snapshot engine 106, source device and target device. Further, the snapshot engine 106 includes data collector 125, analysis module 140, and scheduler 130.

Data collector 125 is configured to collect performance data or statistics relating to storage system 104 to be analyzed by analysis module 140. The performance data may include resource consumption of selected resources of storage system 104. For example, the selected resources may include CPU, disk IO bandwidth, memory, and network bandwidth, etc. It should also be noted that analysis module 140 may be located in another system such as a dedicated analysis system in the cloud. Analysis module 140 is to perform an analysis on the performance data to determine an optimal time window for performing a snapshot of data stored on source device. Scheduler 130 can then schedule snapshot according to optimal time window. Target device 109 stores the snapshot once snapshot has been taken.

An example of a storage system on which aspects of the present invention may be implemented is the VMAX® line of storage systems available from EMC Corporation, Hopkinton, Mass. Another example of a storage system on which aspects of the present invention may be implemented is the VNX® line of storage system, also available from EMC Corporation, Hopkinton, Mass. The architecture shown in FIG. 1 is by way of example, as it should be appreciated that embodiments of the invention described herein may be implemented on numerous other architectures.

Figure 2:
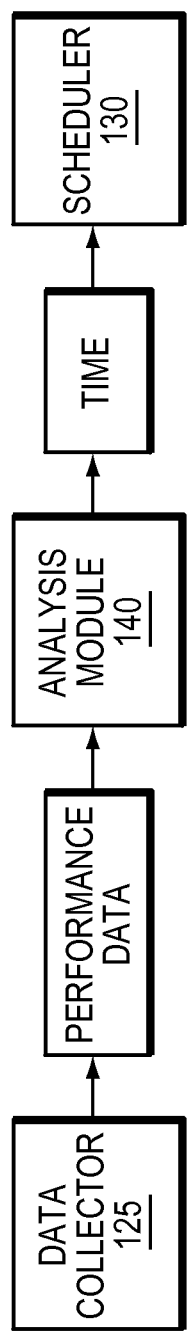
FIG. 2 is a block diagram illustrating a process for scheduling a snapshot according to one embodiment of the invention.

FIG. 2 is a block diagram illustrating a process for scheduling snapshots. The collector 125 collects the performance data which in turn is passed to the analysis module 140. The analysis module performs an analysis to determine the optimal time to perform snapshot based on the performance data. The scheduler 130 schedules the time for performing the snapshot.

Figure 3:
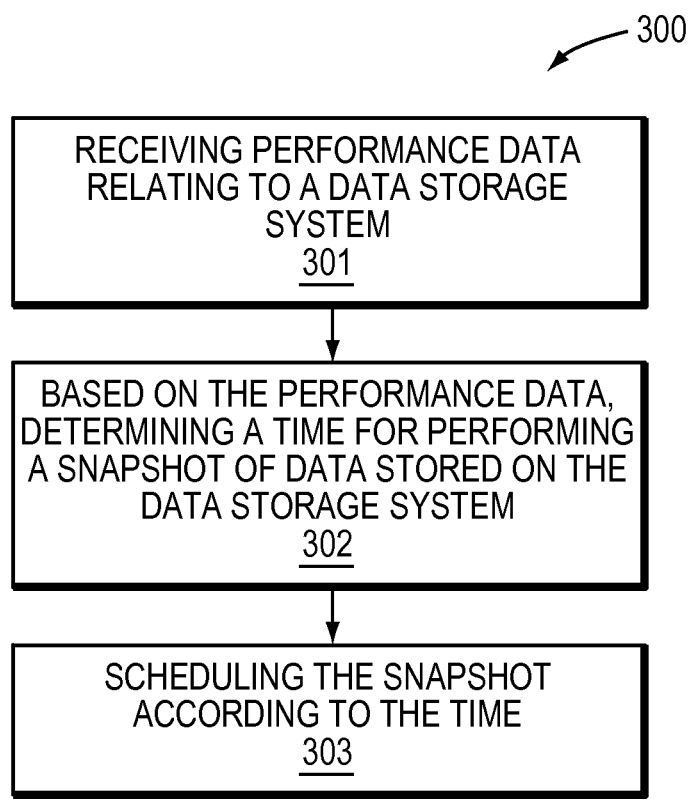
FIG. 3 is a flow diagram illustrating a method for scheduling a snapshot according to one embodiment of the invention.

FIG. 3 illustrates a flow diagram of a method 300 for scheduling snapshots according to one embodiment of the invention. In the flow diagram, the processing steps are summarized in individual blocks. The processing steps may be performed in hardware, or as processor-executable instructions that may be executed by a processor. Furthermore, the processing steps may be performed in many different environments. For example, the processing steps may be performed by storage system 104 in system 100 of FIG. 1 and the steps may be performed by processing logic in software, hardware, or a combination thereof.

Referring back to the figure, at block 301, processing logic receives receiving performance data relating to a data storage system 104. For example, the performance data (or performance statistics) may be historic data that includes resource consumption over a period of time. At block 302, processing logic determines, based on the performance data, a time (e.g., optimal time) for performing a snapshot of data stored on the data storage system. It should be noted that the processing logic may determine the time by performing an analysis on the performance data. At block 303, processing logic schedules a snapshot according to the time.

Figure 4:
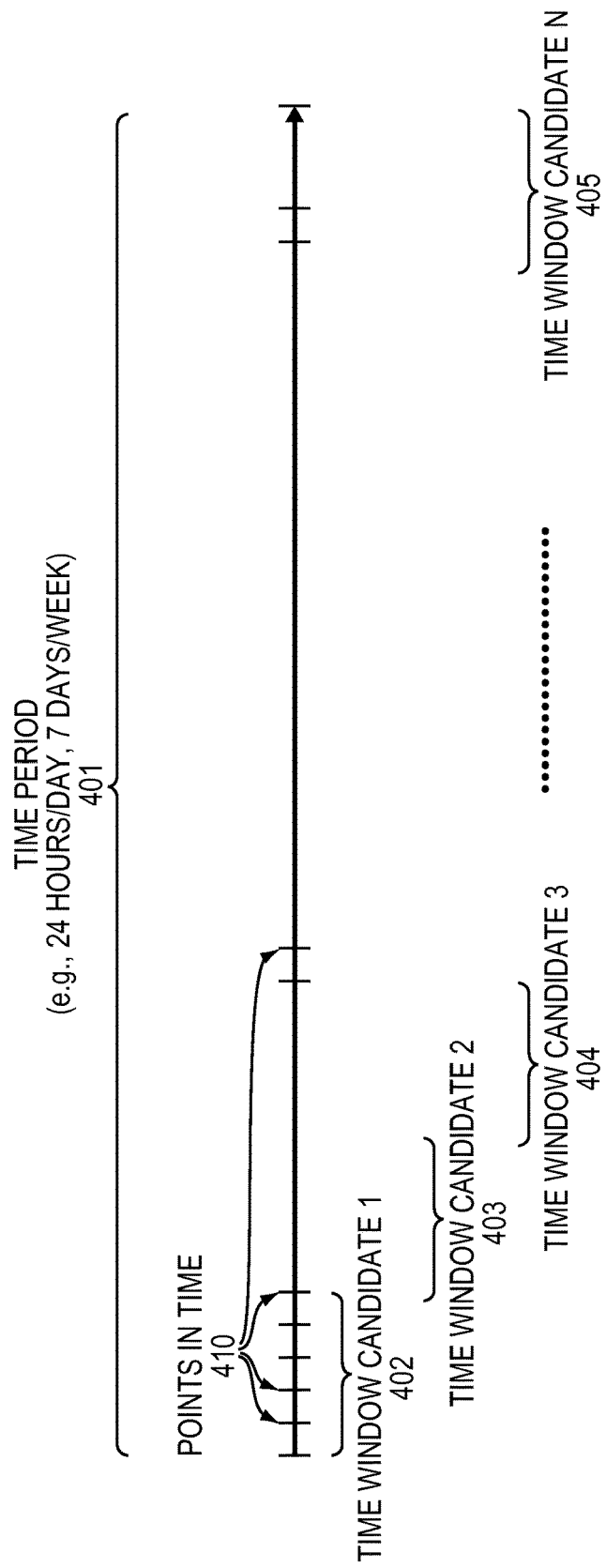
FIG. 4 is a block diagram illustrating a process for determining an optimal time window for performing a snapshot according to one embodiment of the invention.

Referring now to FIG. 4, in one embodiment, in order to determine an optimal time window for taking snapshot, each resource at a given point in time (e.g., points in time 410) is assigned with a weight factor, where the weight factor may represent an importance of the resource at that particular given point in time. For example, resource usages may tend to be higher at certain times of days. Similarly, resource consumptions may tend to be higher during weekdays than weekends. The weight factors for different resources may be the same or different. The weight factors for the same resource at different points in time may be the same or different. A resource at a given point in time is ranked, using a ranking algorithm (e.g., linear or non-linear ranking algorithm) based on the resource consumption of the resource in view of the associated weight factor. Within a predetermined period of time 401 during which the data or statistics were collected, several time window candidates 402-405 for data movement are defined. For each of the time window candidates 402-405, a standard mean value and standard variance of selected or sample points in time within the corresponding time window candidate are calculated based on the ranking of each resource within that particular time window candidate. One or more of the time window candidates are then selected as an optimal time window for data movement based on the calculation, such that the standard mean value and standard variance are within a predetermined range or ranges.

According to one embodiment, a weight $w_i$ between [0, 1] is assigned to each resource identified by an integer i, and based on relative consumption level of each resource and available capacity, the relative importance of each resource can vary at different time. For the sake of simplicity, the weight for N resources at time t is initialized to:

$$w_i(t)=1/N \text{ for } i=1 \ldots N$$

with constraint of:

$$\Sigma w_i(t)=1 \text{ for } i=1 \ldots N$$

$w_i(t)$ can be dynamically adjusted based on relative importance among available resources.

Each resource is ranked, where rank r is a value in the range [0, 1] indicating a level in meeting specified criteria, with 0 indicating least likely and 1 most likely in meeting the criteria (e.g., CPU, memory, network bandwidth, or disk IO centric criteria). A resource can be ranked using a linear ranking algorithm or a non-linear ranking algorithm dependent upon the characteristics of the performance statistics. When performance characteristics of a resource are linearly correlated to the resource consumption level, then the linear ranking algorithm should be utilized. When performance characteristics of a resource are nonlinearly correlated to the resource consumption level, then nonlinear ranking algorithm should be utilized.

In a linear ranking algorithm, according to one embodiment, for each resource i, it is assumed there is a maximum value $M_i$, a minimum value $N_i$, and at time t, the reading for resource i consumption is $v_i(t)$. The rank for resource i at time t is expressed as:

$$r_i(t)=w_i(t)*(M_i-v_i(t))/(M_i-N_i)$$

The rank for all resource at time t is expressed as:

$$r(t)=\Sigma r_i(t)$$

where the value of r(t) should be in the range of [0, 1] representing probability of good match, with 0 indicating worst match, and 1 indicating best match.

For nonlinear ranking, different values of $v_i(t)$ will have nonlinear effect on rank evaluation. A Gaussian function $f(v)$ is used to evaluate contributing factor of a resource value. $f(v)$ is defined as follows:

$$f(v)=\exp(-v^2/2\sigma^2)$$

where $\sigma$ is calculated as the standard deviation for a discrete random variable.

In statistics and probability theory, standard deviation (represented by the symbol sigma, $\sigma$) shows how much variation or "dispersion" exists from the average (mean, or expected value). A low standard deviation indicates that the data points tend to be very close to the mean; high standard deviation indicates that the data points are spread out over a large range of values. The standard deviation of a random variable, statistical population, data set, or probability distribution is the square root of its variance. A useful property of standard deviation is that, unlike variance, it is expressed in the same units as the data. Note, however, that for measurements with percentage as unit, the standard deviation will have percentage points as unit.

The rank for resource i at time t is expressed as:

$$r_i(t)=w_i(t)*f(v_i(t))$$

The rank for all resource at time t is expressed as:

$$r(t)=\Sigma r_i(t)$$

where the value of r(t) has the same meaning as in linear case.

For the purpose of illustration, a history H can be defined as follows:

$$H=[t_1,t_2,\ldots t_n]$$

The corresponding time series values over the history H for a resource variable i can be defined as follows:

$$V_i(H)=[v_i(t_1),v_i(t_2),\ldots v_i(t_n)]$$

The corresponding ranking time series values for all N resource variables can be represented as follows:

$$R(H)=[r(t_1),r(t_2),\ldots r(t_n)]$$

where the linear and non-linear ranking equations can be used to evaluate rank:

$$r(t_i)=\Sigma r_j(t_i) \text{ where } j=1\ldots N$$

For an inclusive subset of time series rank values that are within backup window $D_i=[T_{i0}, T_{i1}]$, compute standard mean value and variance:

$$\mu(D_i)=\Sigma r(t_j)/m$$

$$\sigma(D_i)^2=\Sigma(r(t_j)-\mu(D_i))^2/m$$

where $j=1\ldots m$ and $T_{i0}<t_j<T_{i1}$, and m is the number of rank samples within data movement window $D_i$.

The goal is to select a time window $D_i$ such that the standard mean value $\mu(D_i)$ is within a predefined value range such as between [0, 1], while the standard deviation $\sigma(D_i)$ is within an acceptable margin such as between [0, 1]. A set of $D_i$ calculations over a period of time can help scheduler automatically make informed decisions on time window selections, and adapt with changes.

Figure 5:
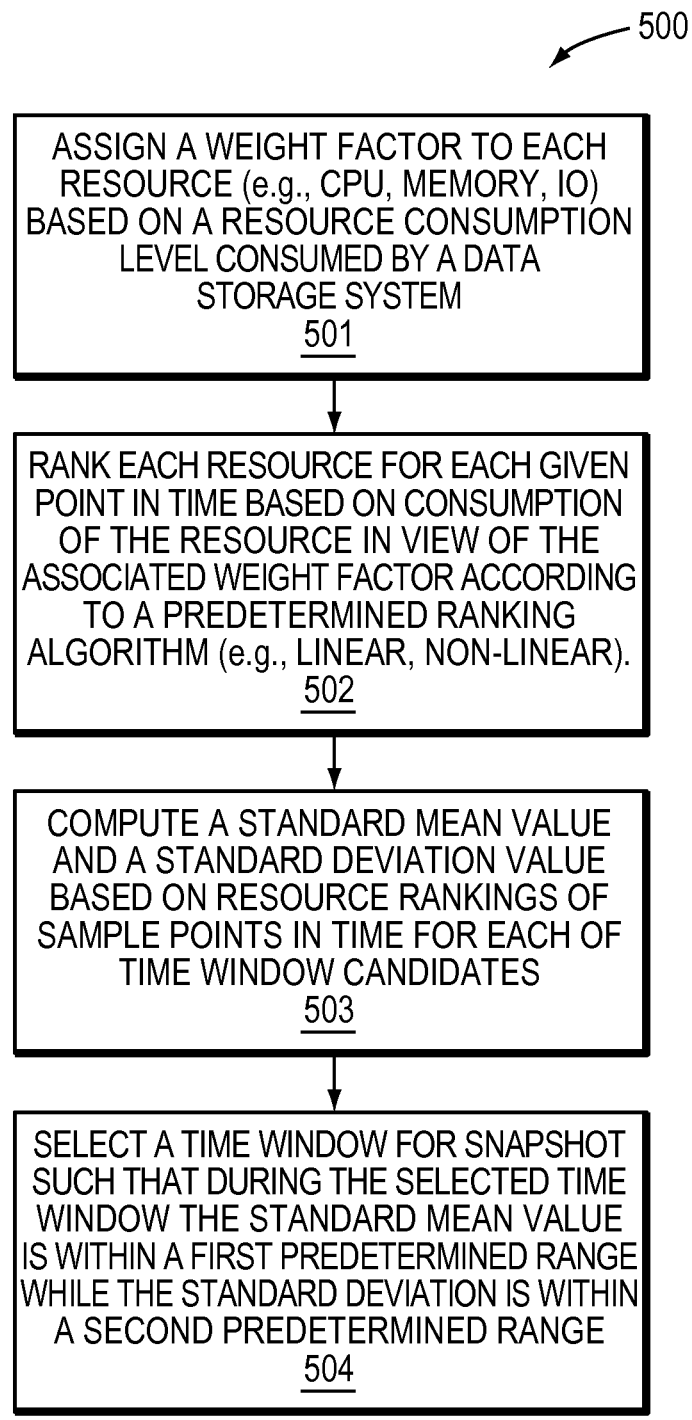
FIG. 5 is a flow diagram illustrating a method for determining an optimal time window for performing a snapshot according to one embodiment of the invention.

FIG. 5 is a flow diagram illustrating a method for determining an optimal data movement window according to one embodiment of the invention. Method 500 may be performed by analysis module 140 of FIG. 1, which may be implemented in software, hardware, or a combination thereof. Referring to FIG. 5, at block 501, processing logic assigns a weight factor to each resource (e.g., CPU, memory, IO, or network bandwidth) based on a resource consumption level consumed by storage system at a given point in time (e.g., time of the day) within a time period (e.g., day, week). Weight factors may be the same or different at different points in time for the same resources. Weight factors may be the same or different for different resources at the same point in time. At block 502, processing logic ranks each resource for each given point in time based on consumption of the resource in view of the associated weight factor according to a predetermined ranking algorithm (e.g., linear, non-linear). At block 503, processing logic computes a standard mean value and a standard deviation value based on resource rankings of sample points in time for each of time window candidates. At block 504, processing logic selects one or more of the time window candidates for performing snapshot, such that during the selected time window(s) the standard mean value is within a first predetermined range while the standard deviation is within a second predetermined range.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving statistics data representing historic performance statistics over a predetermined period of time by a storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, ranking each resource based on its resource consumption in view of its corresponding weight factor for each point in time over the predetermined time period, calculating a standard mean value and a standard deviation value based on resource rankings of sample points in time for each of a plurality of time window candidates, and selecting a time window from the time window candidates for taking snapshot, such that during the selected time window the standard mean value is within a first predetermined range while the standard deviation is within a second predetermined range; and
scheduling, by a scheduler executed by the processor, the snapshot according to the optimal time window.

2. An apparatus, comprising:
a processor; and
a memory coupled to the processor for storing instructions, which when executed from the memory, cause the processor to:
receive statistics data representing historic performance statistics over a predetermined period of time by a storage system, the historic performance statistics including resource consumption of a plurality of resources including at least one of a processor, memory, input-output (IO) transactions, and network bandwidth;
perform an analysis, by an analysis module executed by processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, ranking each resource based on its resource consumption in view of its corresponding weight factor for each point in time over the predetermined time period, calculating a standard mean value and a standard deviation value based on resource rankings of sample points in time for each of a plurality of time window candidates, and selecting a time window from the time window candidates for taking snapshot, such that during the selected time window the standard mean value is within a first predetermined range while the standard deviation is within a second predetermined range; and
schedule, by a scheduler executed by processor, the snapshot according to the optimal time window.

3. A computer program product having a non-transitory computer-readable medium storing instructions, the instructions, when carried out by a processor, causing the processor to perform a method of:
receiving statistics data representing historic performance statistics over a predetermined period of time by a storage system, the historic performance statistics including resource consumption of a plurality of resources including at least one of a processor, memory, input-output (IO) transactions, and network bandwidth;
performing an analysis, by an analysis module executed by processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, ranking each resource based on its resource consumption in view of its corresponding weight factor for each point in time over the predetermined time period, calculating a standard mean value and a standard deviation value based on resource rankings of sample points in time for each of a plurality of time window candidates, and selecting a time window from the time window candidates for taking snapshot, such that during the selected time window the standard mean value is within a first predetermined range while the standard deviation is within a second predetermined range; and
scheduling, by a scheduler executed by processor, the snapshot according to the optimal time window.

4. A computer-implemented method, comprising:
receiving statistics data representing historic performance statistics over a predetermined period of time by a storage system, the historic performance statistics including resource consumption of a plurality of resources including at least one of a processor, memory, input-output (IO) transactions, and network bandwidth;
performing an analysis, by an analysis module executed by a processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, and ranking each resource based on its resource consumption in view of its corresponding weight factor for each point in time over the predetermined time period, wherein ranking $r_i(t)$ for resource i at time t is determined by $r_i(t)=w_i$ $(t)*(M_i-v_i(t))/(M_i-N_i)$, wherein $w_i(t)$ is a weight factor for resource i at time t, wherein $v_i(t)$ is a consumption level of resource i at time t, wherein $M_i$ is a maximum value at time t and $N_i$ is a minimum value at time t; and scheduling, by a scheduler executed by the processor, the snapshot according to the optimal time window.

5. An apparatus, comprising:

a processor; and a memory coupled to the processor for storing instructions, which when executed from the memory, cause the processor to:

receive statistics data representing historic performance statistics over a predetermined period of time by a storage system, the historic performance statistics including resource consumption of a plurality of resources including at least one of a processor, memory, input-output (IO) transactions, and network bandwidth;

perform an analysis, by an analysis module executed by processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, and ranking each resource based on its resource consumption in view of its corresponding weight factor for each point in time over the predetermined time period, wherein ranking $r_i(t)$ for resource i at time t is determined by $r_i(t)=w_i(t)*(M_i-v_i(t))/(M_i-N_i)$, wherein $w_i(t)$ is a weight factor for resource i at time t, wherein $v_i(t)$ is a consumption level of resource i at time t, wherein $M_i$ is a maximum value at time t and $N_i$ is a minimum value at time t; and schedule, by a scheduler executed by processor, the snapshot according to the optimal time window.

6. A computer program product having a non-transitory computer-readable medium storing instructions, the instructions, when carried out by a processor, causing the processor to perform a method of:

receiving statistics data representing historic performance statistics over a predetermined period of time by a storage system, the historic performance statistics including resource consumption of a plurality of resources including at least one of a processor, memory, input-output (IO) transactions, and network bandwidth;

performing an analysis, by an analysis module executed by processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, and ranking each resource based on its resource consumption in view of its corresponding weight factor for each point in time over the predetermined time period, wherein ranking $r_i(t)$ for resource i at time t is determined by $r_i(t)=w_i(t)*(M_i-v_i(t))/(M_i-N_i)$, wherein $w_i(t)$ is a weight factor for resource i at time t, wherein $v_i(t)$ is a consumption level of resource i at time t, wherein $M_i$ is a maximum value at time t and $N_i$ is a minimum value at time t; and scheduling, by a scheduler executed by processor, the snapshot according to the optimal time window.

7. A computer-implemented method, comprising:

receiving statistics data representing historic performance statistics over a predetermined period of time by a storage system, the historic performance statistics including resource consumption of a plurality of resources including at least one of a processor, memory, input-output (IO) transactions, and network bandwidth;

performing an analysis, by an analysis module executed by a processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, and ranking each resource based on its resource consumption in view of its corresponding weight factor for each point in time over the predetermined time period, wherein ranking $r_i(t)$ for resource i at time t is determined by $r_i(t)=w_i(t)*\exp(-v_i(t)^2/2\sigma^2)$, wherein $w_i(t)$ is a weight factor for resource i at time t, wherein $v_i(t)$ is a consumption level of resource i at time t, and wherein $\sigma$ is calculated as a standard deviation for a discrete random variable; and scheduling, by a scheduler executed by the processor, the snapshot according to the optimal time window.

8. An apparatus, comprising:

a processor; and a memory coupled to the processor for storing instructions, which when executed from the memory, cause the processor to:

receive statistics data representing historic performance statistics over a predetermined period of time by a storage system, the historic performance statistics including resource consumption of a plurality of resources including at least one of a processor, memory, input-output (IO) transactions, and network bandwidth;

perform an analysis, by an analysis module executed by processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, and ranking each resource based on its resource consumption in view of its corresponding weight factor for each point in time over the predetermined time period, wherein ranking $r_i(t)$ for resource i at time t is determined by $r_i(t)=w_i(t)*\exp(-v_i(t)^2/2\sigma^2)$, wherein $w_i(t)$ is a weight factor for resource i at time t, wherein $v_i(t)$ is a consumption level of resource i at time t, and wherein $\sigma$ is calculated as a standard deviation for a discrete random variable; and schedule, by a scheduler executed by processor, the snapshot according to the optimal time window.

9. A computer program product having a non-transitory computer-readable medium storing instructions, the instructions, when carried out by a processor, causing the processor to perform a method of:

receiving statistics data representing historic performance statistics over a predetermined period of time by a storage system, the historic performance statistics including resource consumption of a plurality of resources including at least one of a processor, memory, input-output (IO) transactions, and network bandwidth;

performing an analysis, by an analysis module executed by processor, on the historic performance statistics to determine an optimal time window within the predetermined time period for taking a snapshot of data stored on the storage system based on the analysis, wherein performing an analysis on the historic performance statistics comprises assigning a weight factor for each resource for each point in time over the predetermined time period during which the historic performance statistics were collected, and ranking each resource based on its resource consumption in view of its corresponding weight factor for each point in time over the predetermined time period, wherein ranking $r_i(t)$ for resource i at time t is determined by $r_i(t)=w_i(t)*\exp(-v_i(t)^2/2\sigma^2)$, wherein $w_i(t)$ is a weight factor for resource i at time t, wherein $v_i(t)$ is a consumption level of resource i at time t, and wherein $\sigma$ is calculated as a standard deviation for a discrete random variable; and scheduling, by a scheduler executed by processor, the snapshot according to the optimal time window.

* * * * *